US012761594B2

(12) United States Patent
Iwasaki

(10) Patent No.: US 12,761,594 B2
(45) Date of Patent: Oct. 13, 2026

(54) IMAGE FORMING APPARATUS WITH RECORDING MATERIAL CONVEYANCE CONTROL

(71) Applicant: Canon Kabushiki Kaisha, Tokyo (JP)

(72) Inventor: Atsushi Iwasaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/981,874

(22) Filed: Dec. 16, 2024

(65) Prior Publication Data

US 2025/0116955 A1 Apr. 10, 2025

Related U.S. Application Data

(63) Continuation of application No. 18/327,997, filed on Jun. 2, 2023, now Pat. No. 12,204,264.

(30) Foreign Application Priority Data

Jun. 6, 2022 (JP) ................................ 2022-091702

(51) Int. Cl.
*G03G 15/20* (2006.01)
*G03G 15/00* (2006.01)

(52) U.S. Cl.
CPC ..... *G03G 15/2064* (2013.01); *G03G 15/2039* (2013.01); *G03G 15/5045* (2013.01); *G03G 15/6564* (2013.01)

(58) Field of Classification Search
CPC ........... G03G 15/2064; G03G 15/2039; G03G 15/5045; G03G 15/6564
See application file for complete search history.

(56) References Cited

U.S. PATENT DOCUMENTS 12,204,264 B2 * 1/2025 Iwasaki .............. G03G 15/2064
2003/0081962 A1 5/2003 Murata
(Continued)

FOREIGN PATENT DOCUMENTS

JP H04-44075 A 2/1992
JP H05-80665 A 4/1993
(Continued)

OTHER PUBLICATIONS

Japanese Office Action dated Jul. 21, 2026 in counterpart Japanese Patent Appln. No. 2022-091702.

*Primary Examiner* — Sandra Brase
(74) *Attorney, Agent, or Firm* — Venable LLP

(57) ABSTRACT

When a toner image is continuously formed on a plurality of recording materials, and the toner image is fixed onto the recording materials, a conveyance control portion changes throughput, which is the number of recording materials to be conveyed per unit time, from first throughput to second throughput, which is slower than the first throughput, when a second detection temperature detected by a second temperature detecting portion that detects a temperature at an end of a heating member in a longitudinal direction of the heating member perpendicular to a conveyance direction of the recording materials exceeds a first threshold, and changes the throughput from the second throughput to third throughput, which is slower than the second throughput, when the second detection temperature exceeds a second threshold, which is higher than the first threshold, after the recording material conveyed at the second throughput reaches the nip.

11 Claims, 9 Drawing Sheets

(56) References Cited

U.S. PATENT DOCUMENTS

| | | | |
|---|---|---|---|
| 2006/0127112 | A1 | 6/2006 | Ono |
| 2008/0075486 | A1 | 3/2008 | Takahashi |

FOREIGN PATENT DOCUMENTS

| | | | |
|---|---|---|---|
| JP | 2002169413 | A | 6/2002 |
| JP | 2007272031 | A | 10/2007 |
| JP | 2010066682 | A | 3/2010 |
| JP | 2018169491 | A | 11/2018 |

* cited by examiner

IMAGE FORMING APPARATUS WITH RECORDING MATERIAL CONVEYANCE CONTROL

CROSS-REFERENCE TO RELATED APPLICATION

The application is a Continuation Application of U.S. patent application Ser. No. 18/327,997, filed on Jun. 2, 2023, which is hereby incorporated by reference herein in its entirety.

BACKGROUND OF THE INVENTION

Field of the Invention

The present invention relates to a heating fixing apparatus that is mounted on an image forming apparatus of an electrophotographic recording system such as copy machines and printers, or an image heating apparatus such as a gloss providing apparatus that improves a gloss value of an image by re-heating a fixed toner image on a recording material.

Description of the Related Art

An image forming apparatus such as a copy machine or a laser printer of an electrophotographic system includes a heating apparatus (hereinafter referred to as a fixing apparatus) that fixes onto a recording material a toner image formed on a recording material by heating and pressurizing the toner image. For example, a heated roller system that uses a fixing roller and a pressure roller that are cylindrical members including halogen heaters and the like is disclosed as a heating system of the fixing apparatus, and, in addition, a film heating system is disclosed as a heating system that can achieve power saving of a fixing apparatus in, for example, Japanese Patent Application Publication No. H04-44075.

Furthermore, among image forming apparatuses on which such fixing apparatuses are mounted, there is known an image forming apparatus that includes a plurality of temperature detecting members disposed at a heater provided in a fixing apparatus, and performs conveyance control of recording materials or power control of a heater using the plurality of temperature detecting members as disclosed in Japanese Patent Application Publication No. H05-80665. In a case where, for example, a paper feed criterion is the center in a longitudinal direction of the heater (a direction perpendicular to a conveyance direction of the recording materials), a main thermistor is provided near the center, a sub thermistor is provided near an end in the longitudinal direction, and power control for keeping the heater at a target temperature is performed based on a detection temperature of the main thermistor.

When recording materials (hereinafter referred to as “small size paper”) such as envelopes and postcards having relatively narrow widths with respect to a heating range in the longitudinal direction of the fixing apparatus are continuously fed in such an image forming apparatus, a thermal quantity removed by the heater significantly differs between a paper feeding portion and a non-paper feeding portion. Hence, the temperature at the non-paper feeding portion at which the heat quantity is not removed by the recording materials gradually rises as paper continues to be fed, that is, a so-called temperature rise phenomenon at a non-paper feeding portion occurs. Excessive temperature rise at the non-paper feeding portion causes a negative effect of thermally damaging members that constitute the fixing apparatus and therefore shortening an operational lifetime of the apparatus. Hence, control is performed, in which, with temperature rise at the non-paper feeding portion being detected with the sub thermistor, a feeding interval is extended depending on a situation of the temperature of the non-paper feeding portion, a conveyance speed is decreased, or power supply to the heater temporarily stopped.

SUMMARY OF THE INVENTION

As a method used to execute the above-described control, a method is used that changes conveyance control in which, for example, with the temperature of the sub thermistor being detected to have exceeded a predetermined threshold, a feeding interval of recording materials is extended or a conveyance speed of recording materials is decreased. The predetermined threshold is generally set to a temperature at which a certain margin is secured with respect to a heat-resistant temperature of the members that constitute the fixing apparatus. That is, there is a case where, until recording materials, for which the change of the above-described conveyance control has been reflected, reach the fixing apparatus after the sub thermistor detects that the temperature has exceeded the predetermined threshold, recording materials that have already been conveyed prior to the change of conveyance control and have not yet reached the fixing apparatus pass the fixing apparatus. Even in this case, the above threshold is set such that the temperature at the non-paper feeding portion of the fixing member does not exceed the heat-resistant temperature.

However, the threshold is not optimized before and after the change of the conveyance control in a print job for continuously conveying small size paper, and therefore throughput (the number of sheets of paper of job processing per unit time) is not maximized. In other words, there is a problem in that a time for discharging of a group of small size paper involved in the print job is not minimized.

An object of the present invention is to provide a technique that can prevent damages on an apparatus due to excessive temperature rise, and maximize throughput.

In order to achieve the above object, the image forming apparatus according to the present invention includes the following:

- an image forming portion that forms a toner image on a recording material;
- a fixing portion that includes a heating member, a heating rotating member that is heated by the heating member, and a pressure rotating member that comes into contact with an outer surface of the heating rotating member to form a nip between the heating rotating member and the pressure rotating member, the fixing portion fixing the toner image, which has been formed on the recording material nipped and conveyed by the nip, onto the recording material by heating using heat of the heating member;
- a first temperature detecting portion that detects a temperature at a center of the heating member in a longitudinal direction of the heating member perpendicular to a conveyance direction of the recording material;
- a second temperature detecting portion that detects a temperature at an end portion of the heating member in the longitudinal direction;
- a heating control portion that controls the heating of the heating rotating member performed by the heating member, based on a first detection temperature detected by the first temperature detecting portion; and a conveyance control portion that controls the conveyance of the recording material, wherein, in a case where the image forming apparatus continuously forms a toner image on a plurality of recording materials and fixes the toner image onto the recording materials, the conveyance control portion can change throughput that is a number of recording materials to be conveyed per unit time by controlling conveyance of the recording materials, and wherein the throughput is changed from first throughput to second throughput, which is slower than the first throughput, in a case where a second detection temperature detected by the second temperature detecting portion exceeds a first threshold, and is changed from the second throughput to third throughput, which is slower than the second throughput, in a case where the second detection temperature exceeds a second threshold, which is higher than the first threshold, after the recording material conveyed at the second throughput reaches the nip.

Furthermore, in order to achieve the above object, the image forming apparatus according to the present invention includes the following:

an image forming portion that forms a toner image on a recording material;

a fixing portion that includes a heating member, a heating rotating member that is heated by the heating member, and a pressure rotating member that comes into contact with an outer surface of the heating rotating member to form a nip between the heating rotating member and the pressure rotating member, the fixing portion fixing the toner image, which has been formed on the recording material nipped and conveyed by the nip, onto the recording material by heating using heat of the heating member;

a first temperature detecting portion that detects a temperature at a center of the heating member in a longitudinal direction of the heating member perpendicular to a conveyance direction of the recording material;

a second temperature detecting portion that detects a temperature at an end portion of the heating member in the longitudinal direction;

a heating control portion that controls the heating of the heating rotating member performed by the heating member based on a first detection temperature detected by the first temperature detecting portion; and a conveyance control portion that controls the conveyance of the recording material, wherein, in a case where the image forming apparatus continuously forms a toner image on a plurality of recording materials and fixes the toner image onto the recording materials, every time a second detection temperature detected by the second temperature detecting portion exceeds a predetermined threshold updated based on a rise speed of the second detection temperature, the conveyance control portion controls conveyance of the plurality of recording materials such that throughput that is a number of recording materials conveyed per unit time slows.

According to the present invention, it is possible to prevent damages on an apparatus due to excessive temperature rise, and maximize throughput.

Further features of the present invention will become apparent from the following description of exemplary embodiments with reference to the attached drawings.

DESCRIPTION OF THE EMBODIMENTS

Hereinafter, modes for carrying out the present invention will be illustratively described in detail based on the embodiments with reference to the drawings. Note that dimensions, materials, shapes, relative arrangement, and the like of components described in these embodiments should be changed as appropriate depending on configurations and various conditions of apparatuses to which the present invention is applied. Furthermore, all combinations of features described in the present embodiment are not necessarily essential for the solution of the present invention. The components described in the embodiments are merely examples, and do not intend that the scope of the present invention is limited to these components.

Embodiment 1

Figure 1:
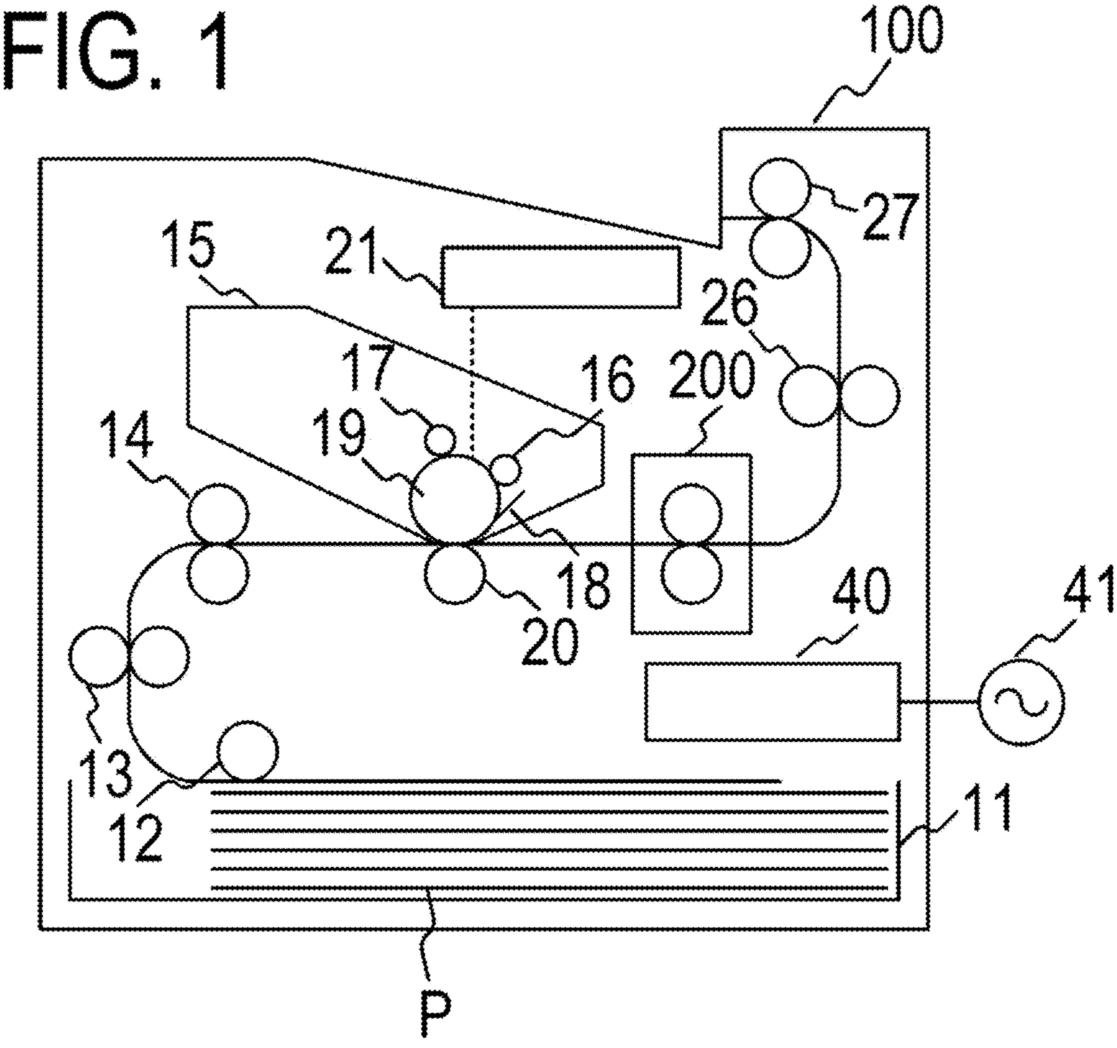
FIG. 1 is a cross-sectional view of an image forming apparatus 100 according to embodiment 1 of the present invention.

FIG. 1 is a schematic cross-sectional view illustrating a schematic configuration of an image forming apparatus 100 that uses an electrophotographic recording technique according to embodiment 1 of the present invention. The image forming apparatus 100 illustrated in FIG. 1 is a laser printer that forms an image on a recording material P by using the electrophotographic system.

When the image forming apparatus 100 receives a print signal, a scanner unit 21 emits laser light modulated according to image information to scan a surface of a photosensitive drum (electrophotographic photosensitive member) 19 charged to a predetermined polarity by a charging roller 16. Thus, an electrostatic latent image is formed on the photosensitive drum 19 that is an image bearing member. When toner charged to the predetermined polarity is supplied to this electrostatic latent image from a developing roller 17, the electrostatic latent image on the photosensitive drum 19 is developed as a toner image (developer image) corresponding to image information. On the other hand, the recording materials (recording paper) P loaded in a feeding cassette 11 are fed one by one by a pickup roller 12, and are conveyed to a pair of resist rollers 14 by a pair of conveyance rollers 13. Furthermore, the recording material P is conveyed from the pair of resist rollers 14 to a transfer position in accordance with a timing at which the toner image on the photosensitive drum 19 reaches the transfer position formed by the photosensitive drum 19 and a transfer roller 20 that is a transfer member. In a process that the recording material P passes the transfer position, the toner image on the photosensitive drum 19 is transferred to the recording material P. A device configuration that is in charge of a process performed until the above unfixed toner image is formed on the recording material P corresponds to an image forming portion according to the present invention.

Subsequently, the recording material P is heated by a fixing apparatus (image heating apparatus) 200 that is a fixing portion (image heating portion) using heat of a heater, and the toner image is heated and fixed to the recording material P. The recording material P that bears the fixed toner image is discharged to a tray at an upper part of the image forming apparatus 100 by a pair of conveyance rollers 26 and 27.

Note that a cleaner 18 removes and cleans remaining toner or the like on the surface of the photosensitive drum 19. The image forming apparatus 100 includes a motor (not illustrated) that provides a driving force of driving various components that constitute the above-described image forming portion, the fixing apparatus 200, and the like. Each component of the image forming apparatus is controlled by a control circuit 40 as a control portion that is connected to a commercial alternating current power supply 41. The control circuit 40 includes functions, too, that are a conveyance control portion that controls a conveyance speed or a conveyance interval of the recording material P during an image forming operation such as formation and fixing of toner images, and a heating control portion that controls a heater drive circuit 400 described later and controls power supply to the fixing apparatus 200.

Furthermore, in the present embodiment, a developing unit including the photosensitive drum 19, the charging roller 16, and the developing roller 17, and the cleaning unit including the drum cleaner 18 are configured to be attachable and detachable as a process cartridge 15 to and from an apparatus main body of the image forming apparatus 100.

Furthermore, although a monochrome laser printer that uses monochrome toner of a single color will be described as a typical example of the above image forming apparatus, the configuration of the image forming apparatus to which the present invention is applied is not limited to this. For example, the present invention is applicable to a color laser printer of a tandem system or the like, too, that transfers color toners of two or more colors onto a recording material via an intermediate transfer belt, and forms an image.

Note that the present embodiment will describe as an example of a configuration where a paper feeding width of the recording material P is 76 mm to 216 mm, and a so-called center conveyance criterion is adopted. That is, the configuration is employed where the recording material P is conveyed to match a center position in a direction perpendicular to a conveyance direction of the recording material P and a center position in the direction perpendicular to the conveyance direction in a conveyance path of the recording material P.

Figure 2:
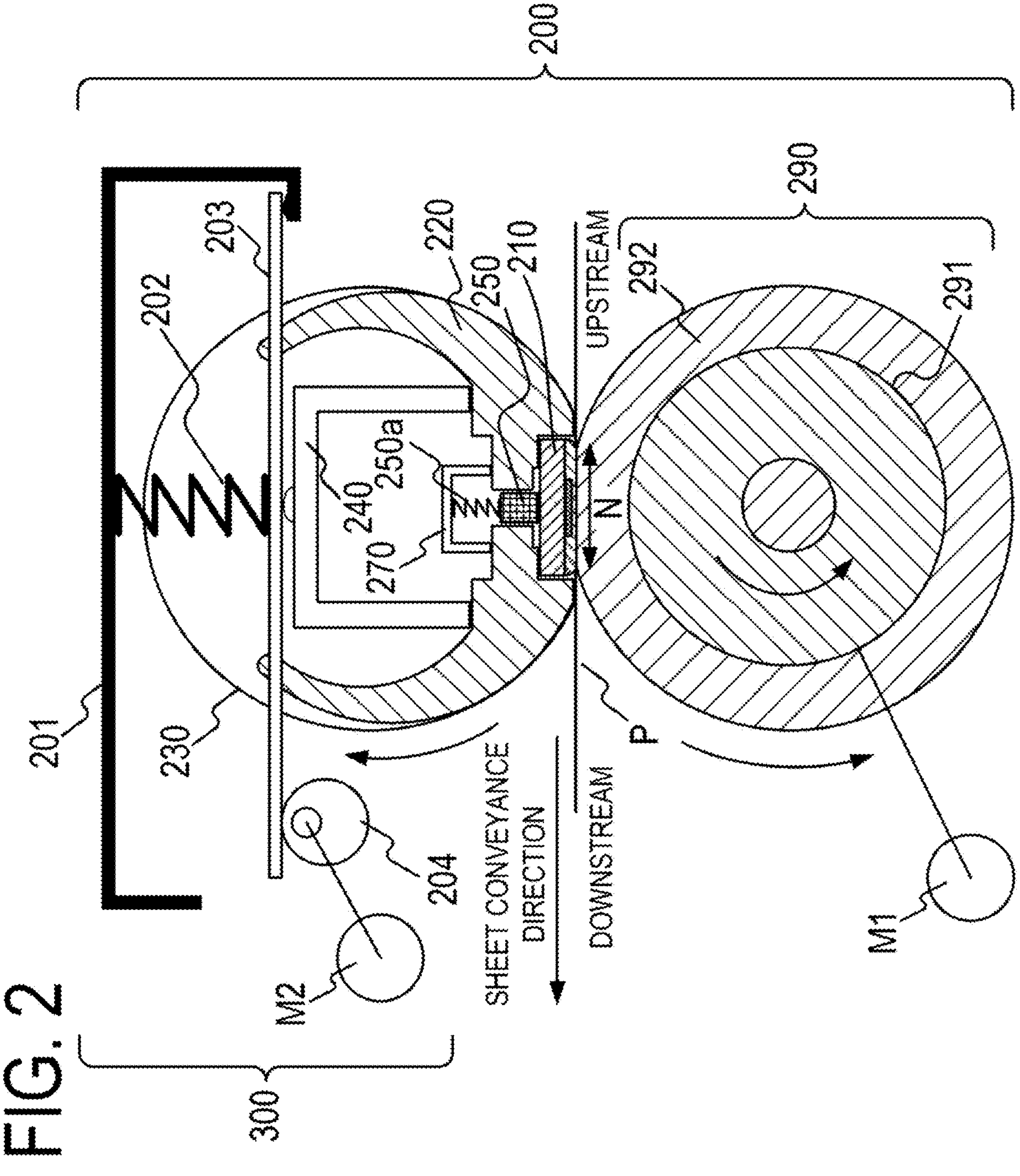
FIG. 2 is a cross-sectional view of a fixing apparatus (image heating apparatus) 200 according to embodiment 1 of the present invention.

FIG. 2 is a schematic cross-sectional view illustrating a schematic configuration of the fixing apparatus 200 according to embodiment 1. The fixing apparatus 200 includes a heater 210 that is a heating body (heating member), a heater holder 220 that is a heating body support member, a film 230 that is a heat rotating member, a main thermistor 250 that is a temperature detecting member, a pressure roller 290 that is a pressure rotating member, and a pressure mechanism 300. The thin heater 210 is disposed in an internal space (a space surrounded by an inner circumferential surface of the film 230) of the cylindrical film 230, and is supported by the heater holder 220 so as to come into contact with an inner surface (inner circumferential surface) of the film 230. The pressure roller 290 comes into contact with an outer surface (outer circumferential surface) of the film 230 to sandwich the film 230 between the heater 210 and the pressure roller 290, and form a fixing nip portion N for nipping the recording material between the film 230 and the pressure roller 290 together with the heater 210 and conveying the recording material. The pressure mechanism 300 applies a pressure force for forming the fixing nip portion N. The main thermistor 250 is disposed in contact with the heater 210, and detects a temperature of the heater 210.

The film 230 is a multilayer heat-resistant film formed in a cylindrical shape, and may include a heat-resistant resin such as polyimide or a metal such as stainless steel as a base, and be provided with an elastic layer such as a heat-resistant rubber or a mold releasing layer made of a heat-resistant resin on the base. The film 230 rotates while coming into contact with and sliding on the heater 210 by being driven by rotation of the pressure roller 290.

The pressure roller 290 includes a core bar 291 whose material is iron, aluminum or the like, and an elastic layer 292 whose material is a silicone rubber or the like, and receives motive power from a motor M1, and then rotates in an arrow direction.

The heater 210 includes ceramics such as alumina or a metal such as SUS as a base, and is formed as a resistance heating member that generates heat when power is distributed.

The main thermistor 250 is used as a unit in which a resistance element whose resistance value changes according to a temperature is supported on a heat-resistant member such as ceramic paper, and that is insulated and protected by a pressure-resistant member such as a polyimide film. The main thermistor 250 is disposed in contact with the heater 210 by a pressure force of a thermistor pressure spring **250*a* held by a pressing member holder 270**.

A pressure stay 240 is a thick member that is formed by a rigid member such as a metal, is disposed in contact with a surface on a side opposite to a heater support surface of the heater holder 220, and applies a pressure force to the pressure roller 290 side to form the fixing nip portion N.

The pressure mechanism 300 includes a fixing frame 201, a pressure spring 202, a pressure plate 203, and a pressure release cam 204. The pressure mechanism 300 applies a pressure force of the pressure spring 202 held by the fixing frame 201 to both longitudinal direction end portions of the pressure stay 240 via the pressure plate 203, and transmits this pressure force to the pressure roller 290 side via a contact portion in contact with the heater holder 220. In this way, the fixing nip portion N is formed. The pressure force is controlled when the pressure plate 203 is displaced in response to change in an acting force of the pressure release cam 204 that receives the motive power from the motor M2 and rotates.

Figures 3A, 3B, 3C:
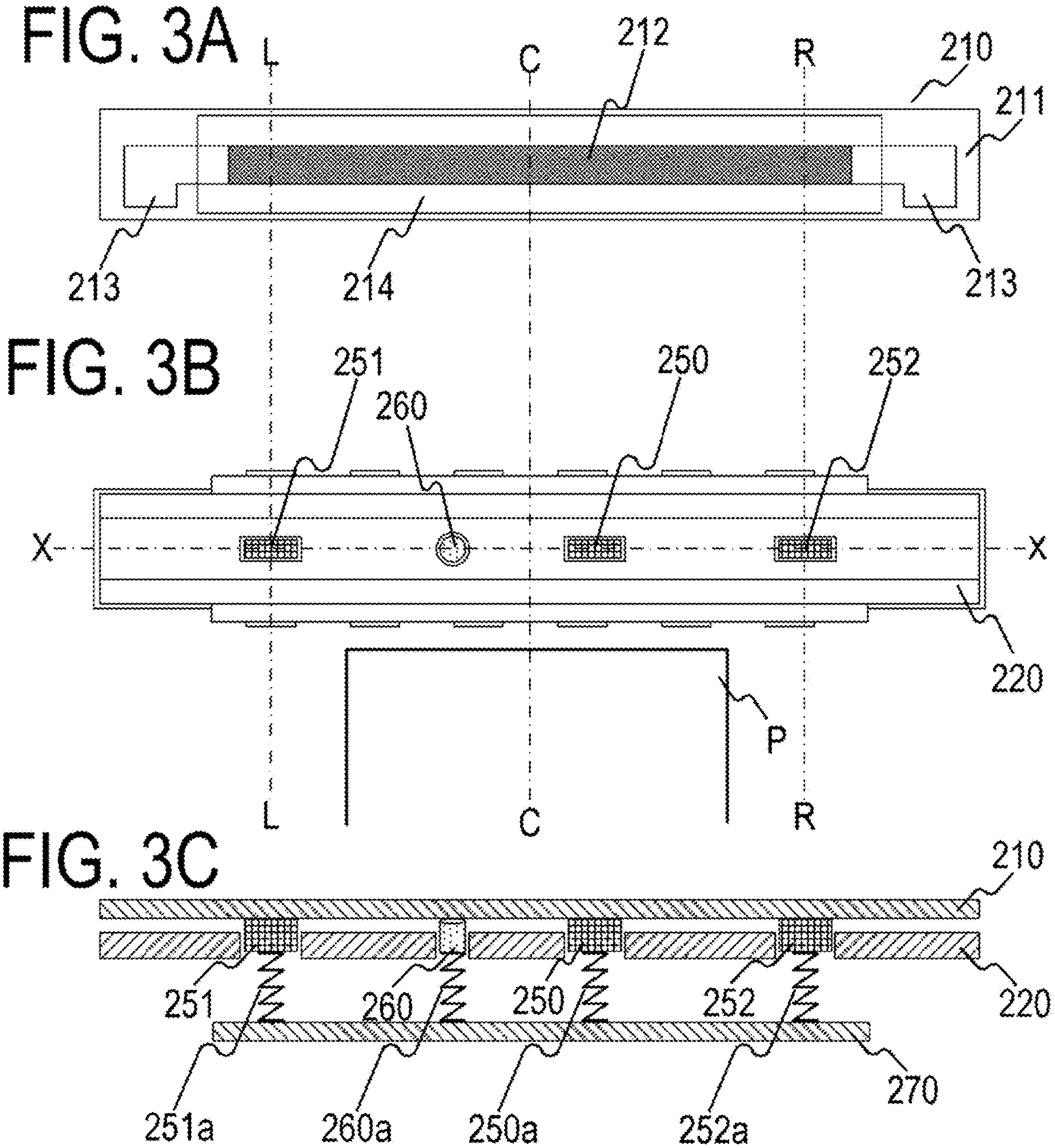
FIGS. 3A to 3C are schematic configuration diagrams around a heater 210 and a heater holder 220 according to embodiment 1.

A configuration around the heater 210 and the heater holder 220 will be described with reference to FIGS. 3A to 3C. FIG. 3A illustrates a schematic plan view of the heater 210 seen from the fixing nip portion N side. The heater 210 whose longitudinal direction is a direction perpendicular to the conveyance direction of the recording material P is formed by forming on a substrate 211, a resistance exothermic member layer 212 that generates heat when power is distributed, an electrode 213 for distributing power to the resistance exothermic member layer 212, and a protection layer 214 that insulates and protects the resistance exothermic member layer 212.

FIG. 3B is a schematic plan view of the heater support surface of the heater holder 220 seen from the fixing nip portion N side, and FIG. 3C is a schematic cross-sectional view of line segment X-X in FIG. 3B. Through-holes are opened at predetermined portions in the longitudinal direction on the heater support surface side of the heater holder 220, and the main thermistor 250, sub thermistors 251 and 252, and a safety element 260 are disposed so as to come into pressure contact with the heater 210 through the respective through-holes.

The main thermistor 250 is first temperature detecting element (first temperature detecting portion) that detects a temperature near the center in the longitudinal direction of the heater 210. The main thermistor 250 is disposed near the center in the longitudinal direction of the heater 210, and is a temperature detecting member for detecting the temperature of the heater 210 at the paper feeding portion of the recording material P, and feeding back the temperature to heating control of the heater 210.

The sub thermistor 251 (252) is second temperature detecting element (second temperature detecting portion) that detects the temperature near the end portion in the longitudinal direction of the heater 210. The sub thermistor 251 (252) is disposed at a position indicated by line segment L-L (line segment R-R) near the end portion in the longitudinal direction of the heater 210. The sub thermistor 251 (252) is a temperature detecting member for detecting the temperature of the heater 210 at a non-paper feeding portion of the recording material P that is small size paper of a narrow width, and feeding back the temperature to conveyance control of the recording materials P. The thermistor 251 (252) is disposed in contact with the heater 210 by a pressure force of a thermistor pressure spring **251*a* (252*a*) held by the pressing member holder 270**.

The safety element 260 is a protection element such as a thermoswitch or a thermal fuse that actuates in an abnormally high temperature state, and blocks power to be supplied to the heater 210. The safety element 260 is disposed in contact with the heater 210 by a pressure force of a safety element pressure spring **260*a* held by the pressing member holder 270**.

Figure 4:
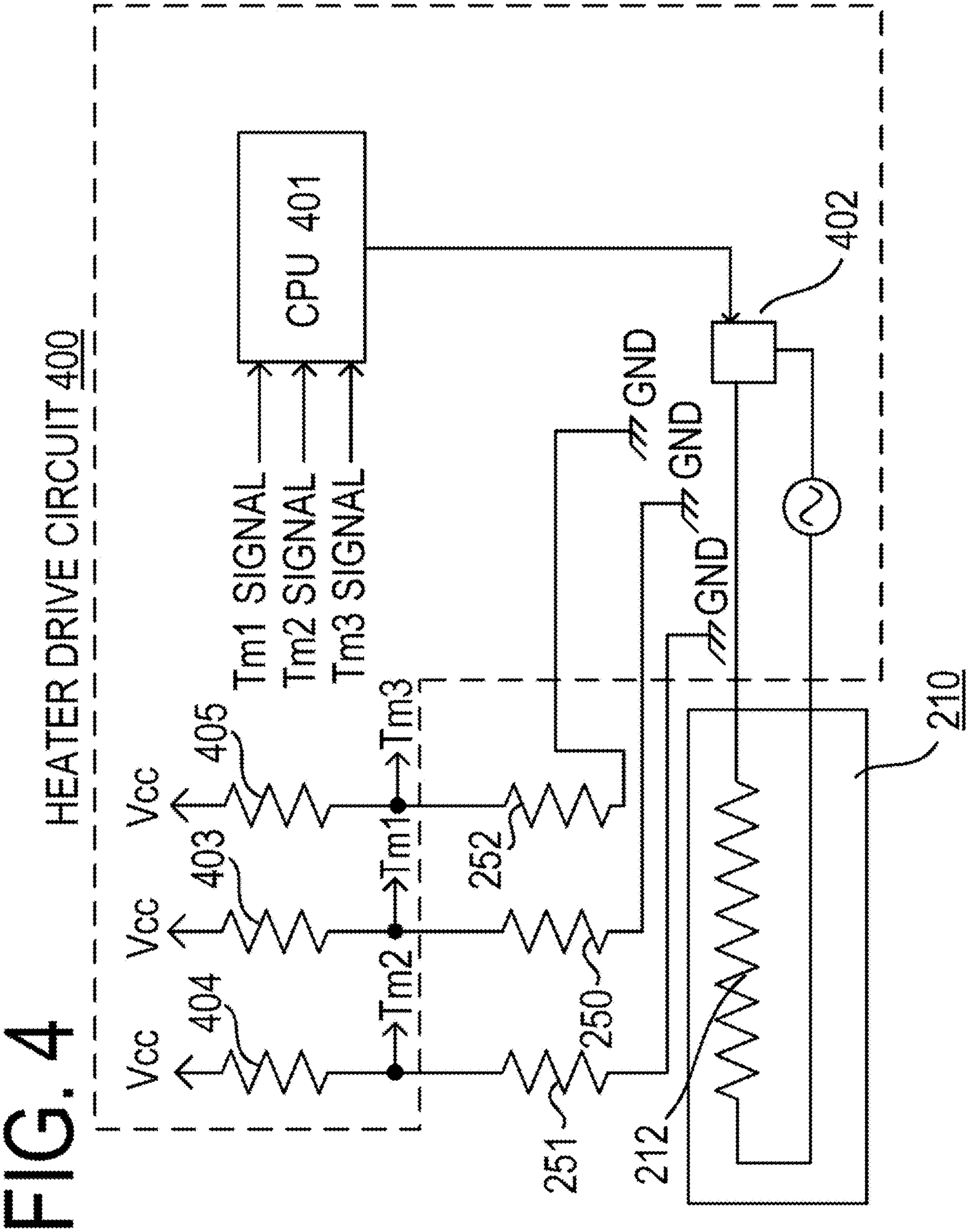
FIG. 4 is a schematic configuration diagram of a heater drive circuit 400 according to embodiment 1.

The heater drive circuit 400 that performs power distribution heating control of the heater 210 will be described with reference to FIG. 4. FIG. 4 is a schematic configuration diagram of the heater drive circuit 400 according to embodiment 1.

The main thermistor 250 is connected in series with a pull-up resistance 403 in the heater drive circuit 400. The main thermistor 250 is applied a Vcc voltage of a direct current, and voltage division information corresponding to a temperature of the main thermistor 250 is input to a CPU 401 as a Tm1 signal, and is converted into temperature information of the main thermistor 250. The CPU 401 controls a heater power distribution amount by switching an ON/OFF timing by a triac 402 based on the temperature information of the main thermistor 250, and controls a temperature to a desired fixing temperature. In the present embodiment, the heater power distribution amount is controlled by so-called phase control of distributing power at a timing corresponding to a desired phase angle based on zero cross of an AC voltage waveform.

Similarly, the thermistor 251 (252) is connected in series with a pull-up resistance 404 (405) in the heater drive circuit 400. The sub thermistor 251 (252) is applied the Vcc voltage of the direct current, and voltage division information corresponding to the temperature of the sub thermistor 251 (252) is input as a Tm2 (Tm3) signal to the CPU 401, and is converted into temperature information of the sub thermistor 251 (252). The sub thermistor 251 (252) monitors a temperature near an end in the longitudinal direction of the heater 210 as described above.

Figure 5:
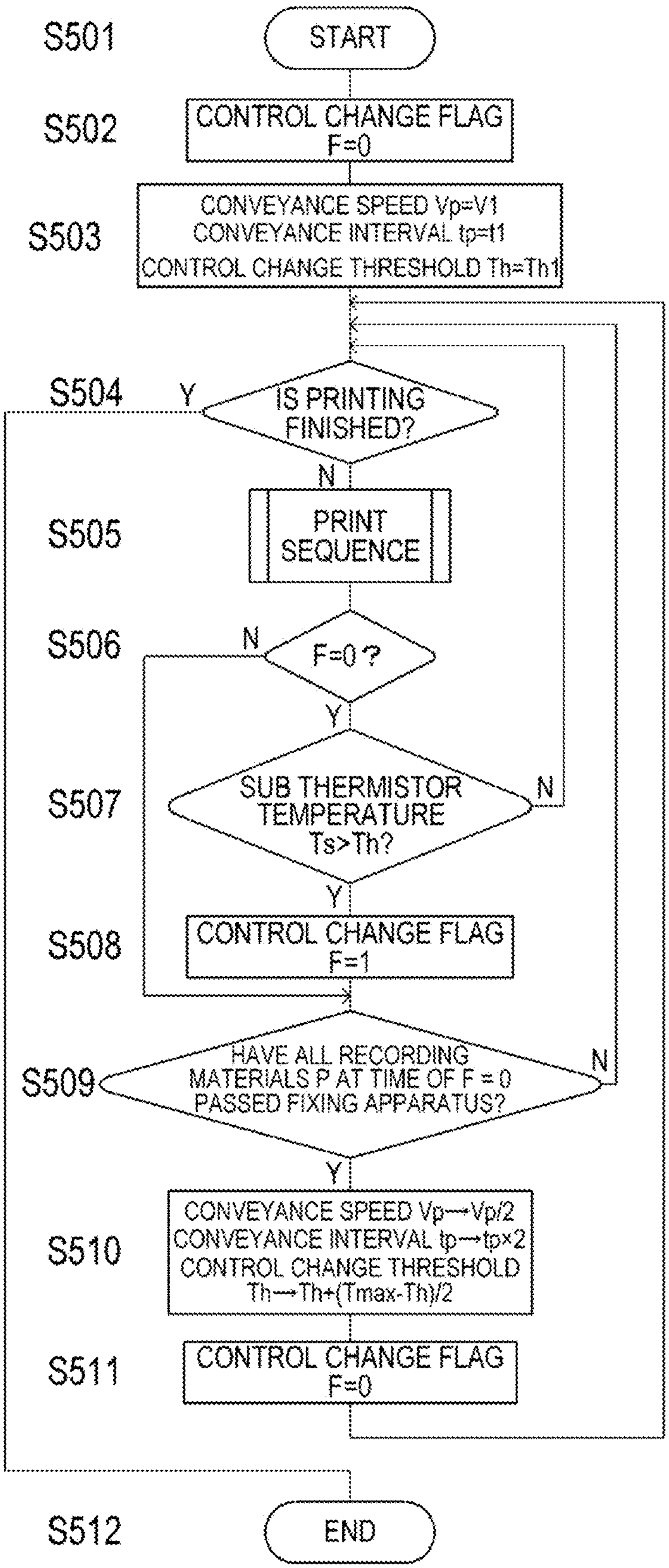
FIG. 5 illustrates a control flowchart according to embodiment 1.

A process of changing conveyance control (throughput that is the number of the recording materials P conveyed per unit time) of the recording materials P that are small size paper based on the detection temperature of the sub thermistor 251 (252) will be described with reference to a flowchart in FIG. 5. FIG. 5 illustrates a control flowchart according to embodiment 1.

The present embodiment will describe an example where the recording materials P that are the small size paper are continuously fed in a vertical direction using an A5 size (148 mm in width and 210 mm in length).

In FIG. 5, when a print job is started, a control change flag F indicating whether to change the conveyance control of the recording materials P is initialized (S502). In the present embodiment, the recording materials P are conveyed at an initial value V1 of a conveyance speed Vp=220 mm/second, and are conveyed at 60 sheets/minute that is first throughput for conveying the recording materials P. In this regard, that the throughout is 60 sheets/minute means that the recording materials P are conveyed at an initial value t1 of a temporal conveyance interval tp for conveying the recording materials P=1 second/sheet. Furthermore, Th1 is set as an initial value (first threshold) of a threshold Th for switching the above control change flag F (S503).

In this regard, the threshold Th1 is set to such a value that a member that may reach a heat-resistant temperature first as a result of temperature rise at the non-paper feeding portion among members that constitute the fixing apparatus does not reach the heat-resistant temperature when a group of the recording materials P pass. In the present embodiment, the member that reaches the heat-resistant temperature first is the film 230 or the pressure roller 290 for fixing that is coated with a rubber layer. The threshold Th1 is set to have a predetermined margin with respect to Tmax where Tmax is a temperature of the sub thermistor 251 or the sub thermistor 252 corresponding to the heat-resistant temperature of the above member. That is, there is a case where, at a point of time at which a temperature Ts of the sub thermistor 251 (252) exceeds the threshold Th1, there are the group of the recording materials P that have already been conveyed at the conveyance speed V1 and the conveyance interval t1. In this case, the threshold Th1 is set such that, even when this group of the recording materials P pass the fixing apparatus 200 and the temperature at the non-paper feeding portion rises, the thermistor 251 (252) does not reach Tmax. That is, the threshold Th1 is set such that the temperature rise caused by the group of the recording materials P that have already been conveyed at the point of time at which the temperature Ts exceeds the threshold Th1 falls within Tmax−Th1.

In S504 to S507, the print sequence is continued for the recording materials P to be continuously conveyed while the temperature Ts of the sub thermistor 251 (252) is monitored.

When Ts exceeds the threshold Th1, the control change flag F is switched from 0 to 1 (S508). Furthermore, before the control change flag F is switched, that is, until all of the group of the recording materials P that have already been conveyed at a time of F=0 (that are being conveyed at the first throughput) pass the fixing apparatus 200, the print sequence is continued without changing conveyance control (S509).

After all of the group of the above recording materials P pass the fixing apparatus 200, conveyance control of the recording materials P to be subsequently conveyed is changed. In the present embodiment, the initial value V1 of the conveyance speed Vp is changed to V2=V1/2, and the initial value t1 of the conveyance interval tp is changed to t2=t1×2. That is, the throughput is changed to 30 sheets/minute that is second throughput slower than 60 sheets/minute that is the first throughput. Furthermore, the threshold Th is changed to Th2=Th1+(Tmax−Th1)/2 that is a second threshold larger (higher) than the initial value Th1 (S510).

The control change flag F is switched from 1 to 0 after change of the above conveyance control is completed (S511), and the print sequence is continued according to a flow in S504 to S511 until the print job ends (S512).

When the temperature Ts of the sub thermistor 251 (252) exceeds the threshold Th2 while printing is performed at V2 as the conveyance speed Vp and t2 as the conveyance interval tp, conveyance control of the recording materials P is changed again. That is, after all of the group of the recording materials P that are already being conveyed at a time of the control change flag F=0 finishes passing the fixing apparatus 200, the conveyance speed Vp is changed from V2 to V3=V2/2, and the conveyance interval tp is changed from t2 to t3=t2×2. That is, the throughput is changed to 15 sheets/minute that is third throughput slower than 30 sheets/minute that is the second throughput. Furthermore, the threshold Th is changed to Th3=Th2+(Tmax−Th2)/2 that is a third threshold larger (higher) than Th2.

Figure 6:
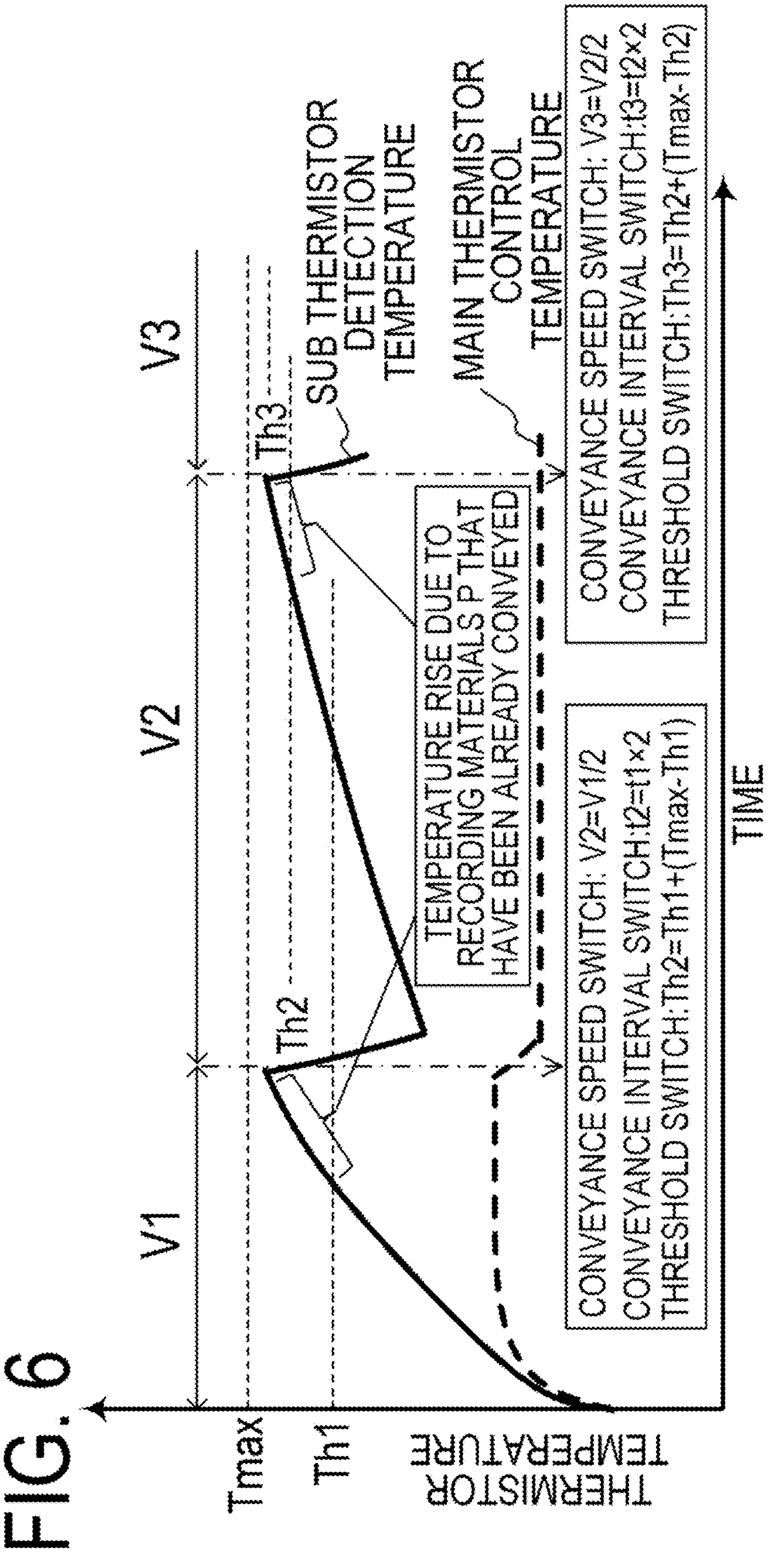
FIG. 6 is a view illustrating a relationship between a thermistor temperature transition and a threshold Th according to embodiment 1.

FIG. 6 illustrates a relationship between temperature transitions of the main thermistor 250 and the sub thermistor 251 (252), and the conveyance speed Vp and the threshold Th at the time of the above-described print job.

In FIG. 6, in an initial state of the print job, that is, at a time of the conveyance speed Vp=V1 (the conveyance interval tp=t1) and the threshold Th=Th1, the detection temperature of the sub thermistor 251 (252) indicated by a solid line rises compared to a control temperature of the main thermistor 250 indicated by a dotted line. The detection temperature of the sub thermistor 251 (252) continues rising due to temperature rise at the non-paper feeding portion caused when the recording materials P pass the fixing apparatus 200, and reaches the threshold Th1.

The fixing apparatus 200 is located at a conveyance direction downstream side of the recording materials P in the image forming apparatus 100, and therefore there is a case where there is the group of the recording materials P that have already been conveyed at a conveyance direction upstream side of the fixing apparatus 200 at a timing at which the temperature reaches the threshold Th1. The group of these recording materials P are conveyed at the conveyance speed V1 (the conveyance interval is t1), and are printed by an image forming process matching the conveyance speed. Hence, until all of the group of these recording materials P pass the fixing apparatus 200, the temperature rise at the non-paper feeding portion continues rising, and the threshold Th1 is set taking this temperature rise into account. Hence, the detection temperature of the sub thermistor 251 (252) does not reach Tmax corresponding to a heat-resistant temperature of the fixing member. After all of the group of these recording materials P finish passing the fixing apparatus 200 and the conveyance speed is switched to V2 (the conveyance interval is t2), the next and subsequent recording materials P are conveyed, and therefore the temperature at the non-paper feeding portion drops until the next and subsequent recording materials P reach the fixing apparatus 200.

The next and subsequent recording materials P are printed by the image forming process according to V2 that is half of the conveyance speed V1 (the conveyance interval is t2 that is twice as much as t1). Hence, while the control temperature of the main thermistor 250 is set low compared to the control temperature before conveyance control is switched, a rise speed of the temperature rise at the non-paper feeding portion of the sub thermistor 251 (252) is approximately half, and draws a moderate rise curve.

Consequently, it is possible to increase the threshold Th2 at a time after the conveyance speed is switched to V2 (conveyance interval is t2) to, for example, an intermediate level of Th1 and Tmax. Even according to this setting, at a timing at which the detection temperature of the sub thermistor 251 (252) reaches the threshold Th2, the detection temperature of the sub thermistor 251 (252) does not reach Tmax until all of the group of the recording materials P that have already been conveyed pass the fixing apparatus 200. That is, it is possible defer a timing to change conveyance control next, that is, to change the conveyance speed from V2 to V3 (the conveyance interval from t2 to t3) by an increase of the threshold from Th1 to Th2. Consequently, it is possible to maximize the throughput of the recording materials P that are the small size paper.

Even when the conveyance speed is changed from V2 to V3, the threshold Th2 can be increased to Th3 based on the same idea as that adopted when the conveyance speed is changed from V1 to V2, so that it is possible to maximize the throughput of the recording materials P.

As described above, the image forming apparatus according to the present embodiment changes the first throughput to the second throughput slower than the first throughput when the detection temperature of the sub thermistor exceeds the first threshold while the recording materials that are small size paper are conveyed at the first throughput. When the detection temperature of the sub thermistor exceeds the second threshold larger than the first threshold after the recording material that has been conveyed at the second throughput reaches the nip, the throughput is further changed. Every time the detection temperature exceeds the threshold, it is possible to maximize the throughput of the recording materials that are the small size paper according to stepwise paper feeding control of repeating changing the threshold and changing the throughput.

Note that, in the present embodiment, change contents of conveyance control performed every time the detection temperature of the sub thermistor exceeds the threshold is that the conveyance speed is 0.5 times, the conveyance interval is 2 times, and the threshold is Th+ (Tmax−Th)/2, yet is not limited to this. That is, change ratios of respective parameters may be adjusted according to an apparatus configuration or the like. For example, the change ratios may not be adjusted to fixed change ratios, and may be differed according to a control change table every time the detection temperature exceeds the threshold. That is, it is possible to freely set the change ratios within a range that satisfies requirements of the present invention, and it is possible to obtain the effect of the present invention similar to the present embodiment.

Embodiment 2

Embodiment 1 has described the example where the conveyance speed Vp is changed as a method for changing conveyance control of the recording materials P. Embodiment 2 will describe an example where the conveyance speed Vp is not changed, and a conveyance interval (a distance between a rear end of a preceding recording material and a front end of a following recording material) between the preceding recording material P and the following recording material P is widened. The configurations of the image forming apparatus and the fixing apparatus according to the present embodiment are the same as those of embodiment 1, and therefore detailed description thereof will be omitted.

Figure 7:
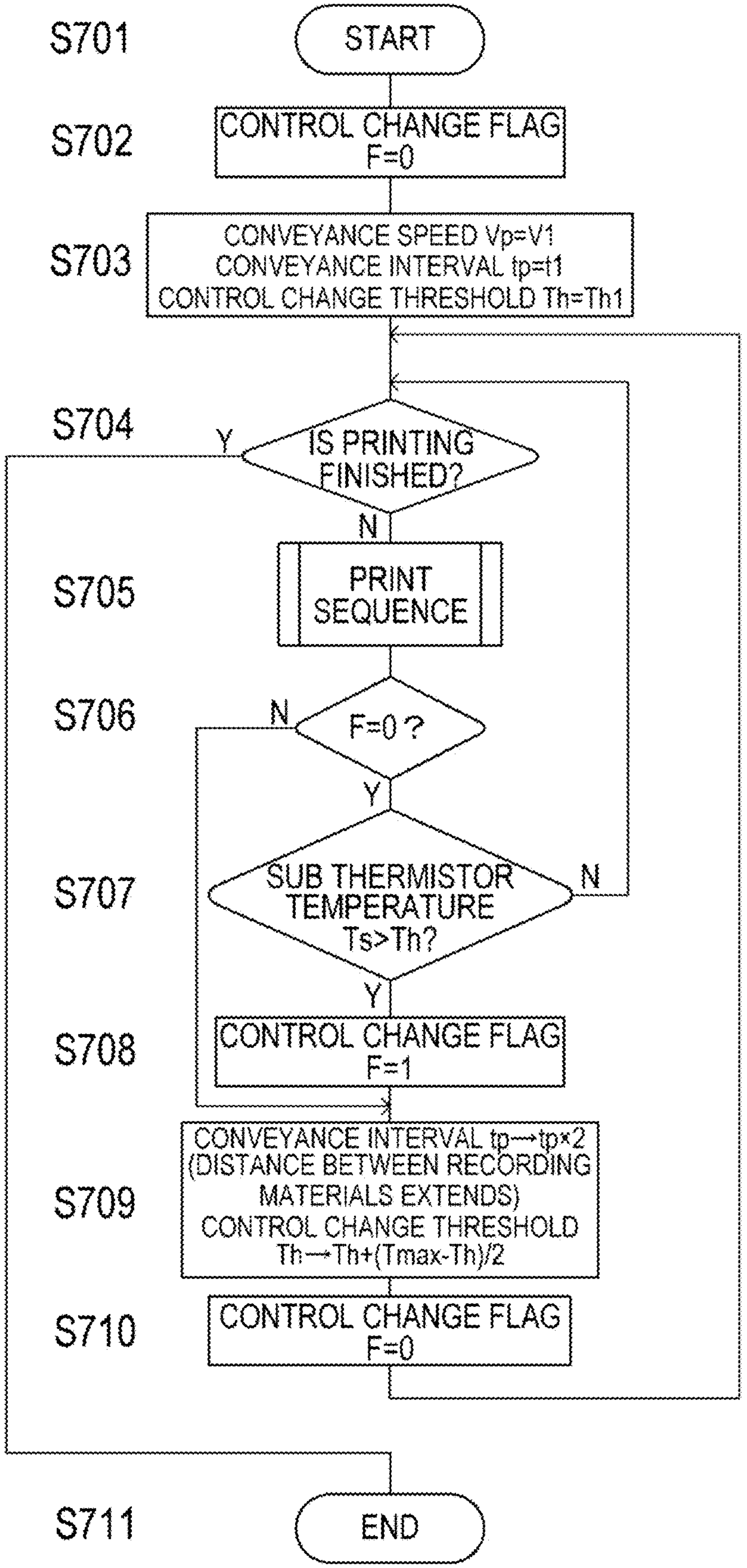
FIG. 7 illustrates a control flowchart according to embodiment 2.

A process of changing conveyance control of the recording material P according to the present embodiment will be described with reference to a flowchart in FIG. 7. FIG. 7 illustrates the control flowchart according to embodiment 2.

In FIG. 7, S701 to S708 are the same as S501 to S508 in FIG. 5 according to embodiment 1. Conveyance control changing unit of the recording materials P changes t1 that is the conveyance interval tp to t2 that is twice in S709, yet does not change the conveyance speed Vp.

Although conveyance control of the recording materials P is changed by changing the conveyance speed Vp in embodiment 1, it is necessary to switch a speed of the overall image forming process when the conveyance speed Vp is switched. Hence, it is necessary to standby for a switching operation until there is no influence on the image forming process of the preceding recording materials P. Furthermore, a certain time is required to switch the conveyance speed, and therefore there is a case where it is not possible to maximize throughput of the entire print job.

By contrast with this, the conveyance speed Vp is not changed in embodiment 2, so that there is little influence on the image process of the preceding recording material P, and it is possible to switch the conveyance interval tp early, and convey the following recording material P. When the control change flag F is switched from 0 to 1 in S708 in FIG. 7, conveyance control of the recording materials P is changed in S709 before all of the group of the recording materials P that are already being conveyed at the time of F=0 finish passing the fixing apparatus 200. The control change flag F is switched from 1 to 0 after change of the above conveyance control is completed (S710), and the print sequence is continued according to a flow in S704 to S710 until the print job ends (S711).

By changing the conveyance interval tp, and, in addition, increasing the threshold Th from Th1 to Th2 after the recording materials P conveyed after conveyance control is changed reaches the fixing apparatus 200 in S709 similar to embodiment 1, it is possible to defer a timing to change conveyance control next, that is, to change the conveyance interval from t2 to t3. Consequently, it is possible to maximize the throughput of the recording materials P that are small size paper. Note that the conveyance interval is twice in the present embodiment, yet is not limited to this, and a change range may be adjusted according to an actual situation.

Embodiment 3

Embodiment 3 will describe an example where the system that changes the conveyance speed Vp according to embodiment 1 and the system that changes the conveyance interval tp without changing the conveyance speed Vp according to embodiment 2 are mixed. The configurations of the image forming apparatus and the fixing apparatus according to the present embodiment are the same as those of embodiment 1, and therefore detailed description thereof will be omitted.

Figure 8:
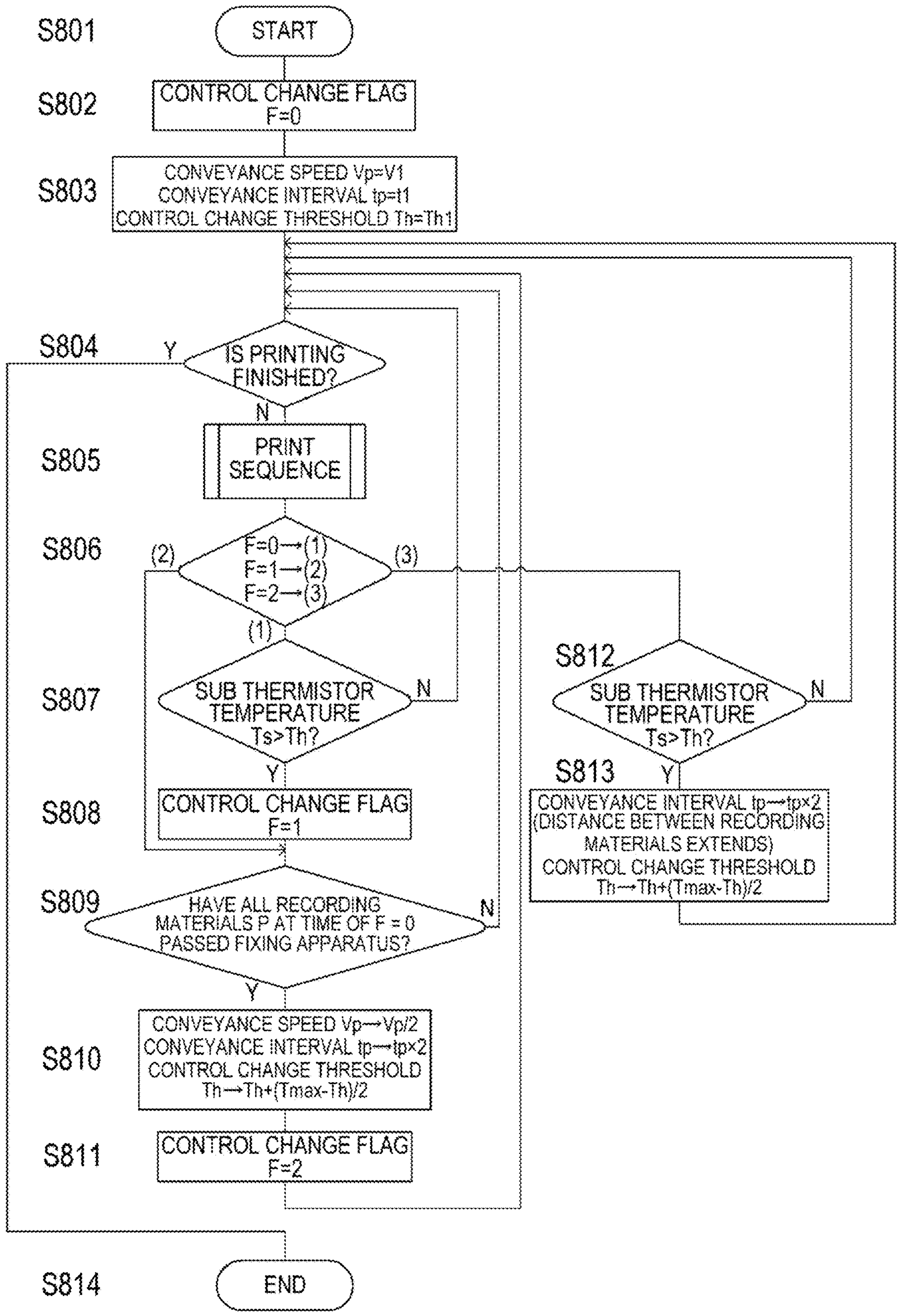
FIG. 8 illustrates a control flowchart according to embodiment 3.

A process of changing conveyance control of the recording material P according to the present embodiment will be described with reference to a flowchart in FIG. 8. FIG. 8 illustrates the control flowchart according to embodiment 3.

In FIG. 8, S801 to S805 are the same as S501 to S505 in FIG. 5 according to embodiment 1. In S806, the control flow is differed according to the value of the control change flag F. In a case of an initial setting, the process transitions from S806 to S807, and the print sequence is continued for the recording materials P that are continuously conveyed until the detection temperature Ts of the sub thermistor 251 (252) exceeds Th1.

When Ts exceeds the threshold Th1, the control change flag F is switched from 0 to 1 (S808). Furthermore, before the control change flag F is switched, that is, until all of the group of the recording materials P that have already been conveyed at the time of F=0 pass the fixing apparatus 200, the print sequence is continued without changing conveyance control (S809).

After all of the group of the above recording materials P finish passing the fixing apparatus 200, conveyance control of the recording materials P to be subsequently conveyed is changed. In the present embodiment, the initial value V1 of the conveyance speed Vp is changed to V2=V1/2, and the initial value t1 of the conveyance interval tp is changed to t2=t1×2. Furthermore, the threshold Th is changed to Th2=Th1+(Tmax−Th1)/2 larger than the initial value Th1 (S810).

After change of the above conveyance control is completed, the control change flag is switched from 1 to 2 (S811). Subsequently, although the print sequence is continued until the print job is finished, the process transitions from S806 to S812. Furthermore, when the detection temperature Ts of the sub thermistor 251 (252) exceeds the threshold Th, the process transitions to S813 before all of the group of the recording materials P that are already being conveyed at this point of time finish passing the fixing apparatus 200, and the conveyance interval tp is set to twice (the conveyance speed Vp is not changed). The threshold Th is increased after the recording materials P conveyed after conveyance control is changed reach the fixing apparatus 200 similar to embodiment 2. The print sequence until the print job ends (S814).

By mixing the system that changes the conveyance speed Vp and the system that changes the conveyance interval tp without changing the conveyance speed Vp as in the present embodiment, it is possible to maximize the throughput of the entire print job according to the actual situation.

Embodiment 4

Embodiment 4 will describe an example where a temperature rising speed (rise speed) of the detection temperature Ts of the sub thermistor 251 (252) is measured, and the threshold Th for changing conveyance control is determined (updated) according to the temperature rising speed. The configurations of the image forming apparatus and the fixing apparatus according to the present embodiment are the same as those of embodiment 1, and therefore detailed description thereof will be omitted.

Figure 9:
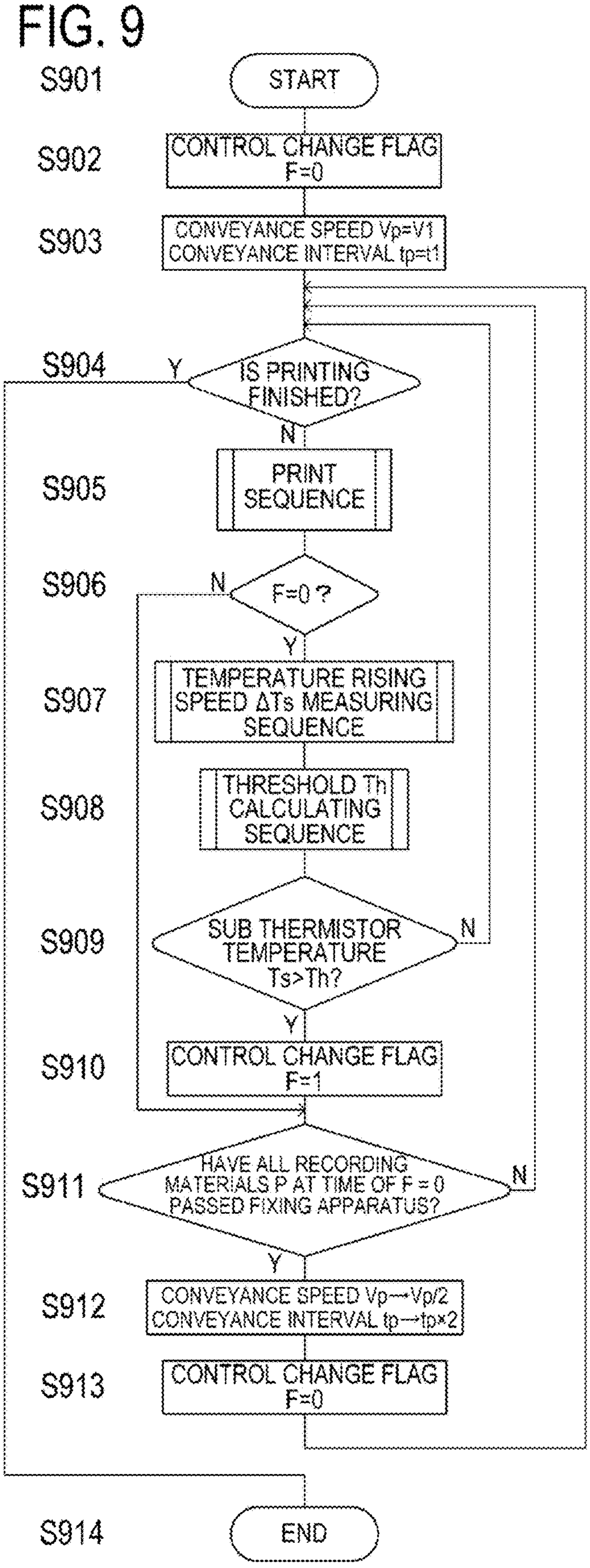
FIG. 9 illustrates a control flowchart according to embodiment 4.

A process of changing conveyance control of the recording material P according to the present embodiment will be described with reference to a flowchart in FIG. 9. FIG. 9 illustrates the control flowchart according to embodiment 4.

In FIG. 9, when the print job is started (S901), the control change flag F indicating whether or not conveyance control of the recording materials P is changed is initialized in S902. An example where, in S903, the recording materials P are conveyed at the initial value V1 of the conveyance speed Vp=220 mm/second, and are conveyed at 60 sheets/minute that is the first throughput for conveying the recording materials P similar to embodiment 1 will be described. That is, the initial value t1 of the conveyance interval tp of the recording materials P=1 second/sheet holds. In S903, the threshold Th for switching the above control change flag F is not set.

In S904 to S909, while a temperature rising speed ΔTs of the sub thermistor 251 (252) is measured for the recording materials P to be continuously conveyed, the threshold Th for switching the control change flag F is calculated. That is, the threshold Th is updated (reviewed) based on the temperature rising speed ΔTs acquired from the detection temperature of the sub thermistor 251 (252). The print sequence is continued while updating this threshold Th and monitoring the detection temperature of the sub thermistor 251 (252).

In a temperature rising speed measuring sequence in S907, the temperature rising speed ΔTs of the sub thermistor 251 caused when the recording materials P pass the fixing apparatus 200 is measured. Examples of measuring methods include a method for measuring temperature rise caused every time the one recording material P passes, and a method for measuring temperature rise caused when the plurality of recording materials P including the one recording material P pass, and calculating a moving average. That is, it is sufficient that the method can calculate the temperature rising speed ΔTs of the sub thermistor 251 (252) based on the recording materials P that have been continuously conveyed at the same throughput. The temperature rising speed ΔTs of the sub thermistor 251 (252) changes according to the conveyance speed Vp and the conveyance interval tp of the recording materials P and, in addition, a type and a size of the recording materials P, an environmental temperature at which the recording materials P are conveyed, and a heating control temperature of the recording materials P. According to the temperature rising speed measuring sequence according to the present embodiment, it is possible to measure the temperature rising speed ΔTs including elements other than the throughput (the conveyance speed Vp and the conveyance interval tp) of the recording materials P.

In a threshold calculating sequence in S908, temperature rise caused by the group of the recording materials P that have already been conveyed at the throughput at the conveyance upstream side of the fixing apparatus 200 is predicted referring to the above-described temperature rising speed ΔTs. Then, the threshold Th for switching the control change flag F is calculated such that the detection temperature Ts of the sub thermistor 251 (252) does not reach Tmax corresponding to the heat-resistant temperature of the fixing member. That is, the threshold Th is determined such that the temperature rise caused by the group of the recording materials P that have already been conveyed falls within Tmax−Th.

In S909, the detection temperature Ts of the sub thermistor 251 (252) and the threshold Th determined in S908 are compared, and, when the detection temperature Ts exceeds the threshold Th, the control change flag F is switched from 0 to 1. Furthermore, before the control change flag F is switched, that is, until all of the group of the recording materials P that have already been conveyed at the time of F=0 pass the fixing apparatus 200, the print sequence is continued without changing conveyance control (S911).

After all of the group of the above recording materials P finish passing the fixing apparatus 200, conveyance control of the recording materials P to be subsequently conveyed is changed. In S912, the initial value V1 of the conveyance speed Vp is changed to V2=V1/2, and the initial value t1 of the conveyance interval tp is changed to t2=t1×2. The threshold Th is determined as appropriate in S908, and therefore the threshold Th is not changed in S912.

The control change flag is switched from 1 to 0 after change of the above conveyance control is completed (S913), and the print sequence is continued according to a flow in S904 to S913 until the print job ends (S914).

In the present embodiment, the temperature rising speed of the detection temperature of the sub thermistor caused when the recording materials P pass the fixing apparatus is measured as described above. In the present embodiment, too, as the temperature rising speed of the detection temperature of the sub thermistor 251 (252) becomes lower, a value of the threshold to be updated changes to a larger value. Consequently, it is possible to measure the temperature rising speed that takes into account the type and the size of the recording materials P, the environmental temperature at which the recording materials P are conveyed, the heating control temperature of the recording materials P, and the like, so that it is possible to maximize the throughput of the recording materials P that are small size paper according to a situation.

Note that the present embodiment has described the example where the threshold for changing conveyance control is determined using the temperature rising speed measuring sequence and the threshold calculating sequence in embodiment 1, yet may be applied to embodiments 2 and 3. That is, in embodiment 2 and embodiment 3, even if the threshold is determined based on the idea described in the present embodiment, it is possible to obtain the same effect.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091702, filed on Jun. 6, 2022, which is hereby incorporated by reference herein in its entirety.

What is claimed is:

1. An image forming apparatus comprising:

an image forming portion configured to form a toner image on a recording material;

a fixing portion configured to fix the toner image formed on the recording material onto the recording material, the fixing portion including a heating member, a heating rotating member that is heated by the heating member, and a pressure rotating member that comes into contact with an outer surface of the heating rotating member to form a nip for nipping and conveying the recording material between the heating rotating member and the pressure rotating member;

a first temperature detecting portion configured to detect a temperature of a region of the heating member through which a small-sized recording material passes, in a longitudinal direction of the heating member that is perpendicular to a conveyance direction of the recording material;

a second temperature detecting portion configured to detect a temperature of a region of the heating member outside the small-sized recording material passing region in the longitudinal direction of the heating member;

a heating control portion configured to control the heating member based on the temperature detected by the first temperature detecting portion; and a conveyance control portion configured to control the conveyance of the recording material, wherein, in a case where the image forming apparatus continuously forms the toner image on a plurality of recording materials and fixes the toner image onto the recording materials, the conveyance control portion can change throughput that is a number of recording materials to be conveyed per unit time by controlling conveyance of the recording materials, and wherein the throughput (i) is changed from first throughput to second throughput that is lower than the first throughput by reducing a conveyance speed of the recording material at the nip from a first speed to a second speed lower than the first speed when the temperature detected by the second temperature detecting portion exceeds a first threshold, and (ii) is changed from the second throughput to a third throughput that is lower than the second throughput by further reducing the conveyance speed of the recording material at the nip from the second speed to a third speed lower than the second speed when the temperature detected by the second temperature detecting portion exceeds a second threshold that is higher than the first threshold.

2. The image forming apparatus according to claim 1, wherein when the temperature detected by the second temperature detecting portion exceeds the first threshold, the conveyance control portion changes the conveyance speed of the recording material from the first speed to the second speed after all recording materials being conveyed at the first speed have passed through the nip, and wherein when the temperature detected by the second temperature detecting portion exceeds the second threshold, the conveyance control portion changes the conveyance speed of the recording material from the second speed to the third speed after all recording materials being conveyed at the second speed have passed through the nip.

3. The image forming apparatus according to claim 2, wherein the second speed is one half of the first speed.

4. The image forming apparatus according to claim 3, wherein the third speed is one half of the second speed.

5. The image forming apparatus according to claim 1, wherein the heat rotating member is a cylindrical film, wherein the heating member is a heater that is disposed in an internal space of the film, wherein the heater includes a substrate and a resistance exothermic member layer formed on the substrate, and wherein the pressure rotating member is a roller and forms the nip between the film and the roller by sandwiching the film between the heater and the roller.

6. The image forming apparatus according to claim 5, wherein the substrate is made of ceramics or metal.

7. An image forming apparatus comprising:

an image forming portion configured to form a toner image on a recording material;

a fixing portion configure to fix the toner image formed on the recording material onto the recording material, the fixing portion including a heating member, a heating rotating member that is heated by the heating member, and a pressure rotating member that comes into contact with an outer surface of the heating rotating member to form a nip for nipping and conveying the recording material between the heating rotating member and the pressure rotating member;

a first temperature detecting portion configured to detect a temperature of a region of the heating member through which a small-sized recording material passes, in a longitudinal direction of the heating member that is perpendicular to a conveyance direction of the recording material;

a second temperature detecting portion configured to detect a temperature of a region of the heating member outside the small-sized recording material passing region in the longitudinal direction of the heating member;

a heating control portion configured to control the heating member based on the temperature detected by the first temperature detecting portion; and a conveyance control portion configured to control the conveyance of the recording material, wherein, in a case where the image forming apparatus continuously forms the toner image on a plurality of recording materials and fixes the toner image onto the recording materials, the conveyance control portion can change throughput that is a number of recording materials to be conveyed per unit time by controlling conveyance of the recording materials, and wherein the throughput (i) is changed from first throughput to second throughput that is lower than the first throughput by reducing a conveyance speed of the recording material at the nip from a first speed to a second speed lower than the first speed when the temperature detected by the second temperature detecting portion exceeds a first threshold, and (ii) is changed from the second throughput to a third throughput that is lower than the second throughput by increasing a conveyance interval of recording materials when the temperature detected by the second temperature detecting portion exceeds a second threshold that is higher than the first threshold.

8. The image forming apparatus according to claim 7, wherein when the temperature detected by the second temperature detecting portion exceeds the first threshold, the conveyance control portion changes the conveyance speed of the recording material from the first speed to the second speed after all recording materials being conveyed at the first speed have passed through the nip.

9. The image forming apparatus according to claim 8, wherein the second speed is one half of the first speed.

10. The image forming apparatus according to claim 7, wherein the heat rotating member is a cylindrical film, wherein the heating member is a heater that is disposed in an internal space of the film, wherein the heater includes a substrate and a resistance exothermic member layer formed on the substrate, and wherein the pressure rotating member is a roller and forms the nip between the film and the roller by sandwiching the film between the heater and the roller.

11. The image forming apparatus according to claim 10, wherein the substrate is made of ceramics or metal.

* * * * *